United States Patent [19]
Geil

[11] 3,755,888
[45] Sept. 4, 1973

[54] METHOD OF TESTING MODULAR ELECTRONIC CIRCUITS

[75] Inventor: Fred G. Geil, San Diego, Calif.

[73] Assignee: Westinghouse Electric Corporation, Pittsburgh, Pa.

[22] Filed: July 17, 1972

[21] Appl. No.: 272,276

[52] U.S. Cl............ 29/593, 324/73 PC, 317/101 C
[51] Int. Cl............................................. G01r 31/28
[58] Field of Search............................. 29/593, 407; 324/73 R, 73 PC; 317/101 C

[56] References Cited
UNITED STATES PATENTS

| | | | |
|---|---|---|---|
| 3,264,562 | 8/1966 | Brown et al. | 29/593 |
| 3,564,408 | 2/1971 | Schulz et al. | 324/73 R |
| 3,143,702 | 8/1964 | Kohler et al. | 324/73 PC |
| 2,918,648 | 12/1959 | Ludman et al. | 324/73 PC |
| 3,458,807 | 7/1969 | Smith | 29/593 |
| 3,227,927 | 1/1966 | Parstorfer | 317/101 C |
| 3,407,925 | 10/1968 | Ruehlemann | 206/65 F |

FOREIGN PATENTS OR APPLICATIONS

| | | | |
|---|---|---|---|
| 7,001,261 | 7/1970 | Netherlands | 324/73 PC |
| 977,951 | 12/1964 | Great Britain | 317/101 C |

Primary Examiner—Charles W. Lanham
Assistant Examiner—D. C. Crane
Attorney—Richard S. Sciascia, William T. Skeer et al.

[57] ABSTRACT

This invention pertains to a method and means for construction and operation of electronic circuits. A circuit board having a conducting copper pattern configured in a standard universal layout is employed to mount the components comprising the desired circuit. A socket having two rows of connectors is used to mount each individual circuit board. Each electrical socket is adapted to receive the circuit board in either of two oppositely facing positions. Each row of connectors is designed to make circuit connection with the board in one position. Both rows of connectors are wired for power, synchronizing signals, etc. However, only one row of terminals is wired to connect the circuit board to other sockets and the circuit boards installed therein. The remaining row of connectors are wired to connect the input and output of the circuit board in a suitable test configuration. The circuit board is connected to the desired row of terminals by inserting it in the socket in the corresponding particular position. Connection to the other row of terminals, when desired, is made by removing the board and reversing it and replacing it in the socket in an oppositely facing direction.

5 Claims, 6 Drawing Figures

Patented Sept. 4, 1973     3,755,888

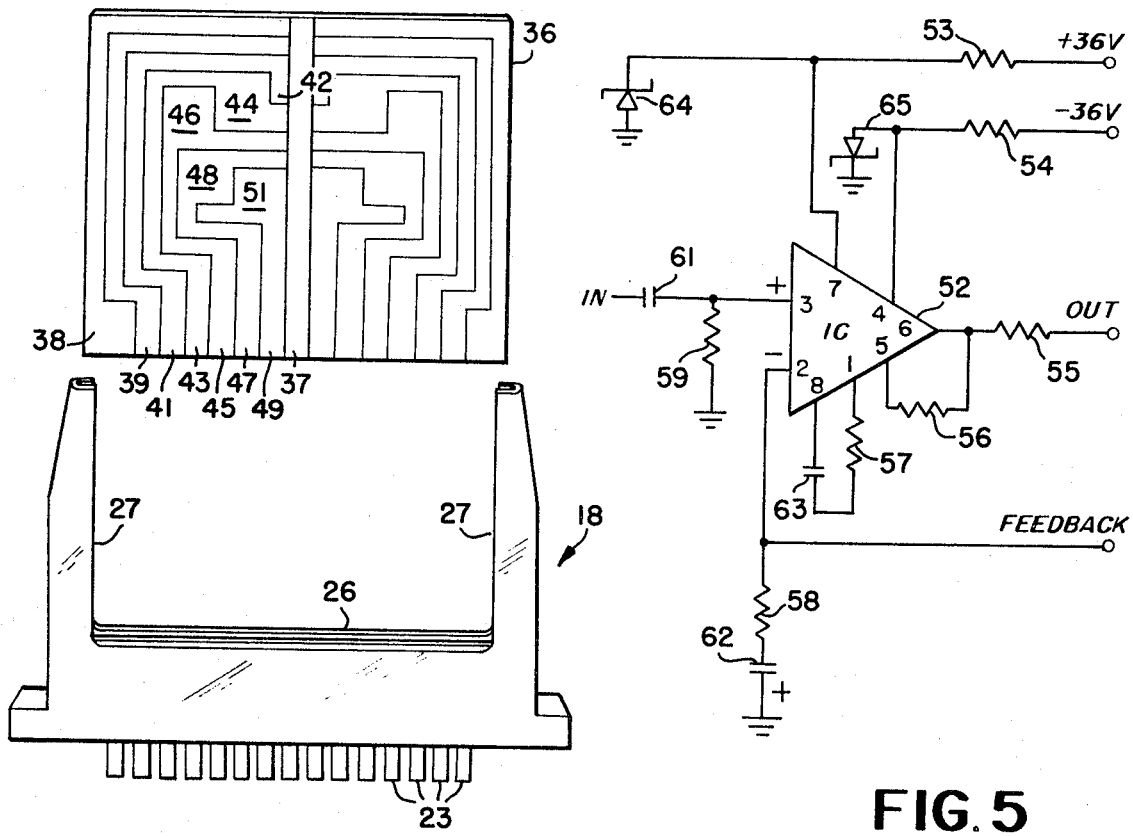

3,755,888

METHOD OF TESTING MODULAR ELECTRONIC CIRCUITS

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the electronic engineering arts. More particularly, this invention pertains to the design and fabrication of electronic modular circuits. In way of further clarification, this invention pertains to the construction of modular electronic circuits and testing thereof prior to incorporation and final design assembly. In greater particularity, but not by way of limitation, this invention pertains to a modular circuit board construction and cooperating interconnecting socket arrangement which permits testing of the circuit on the circuit board by reversing the direction that the circuit board is inserted in the cooperating socket.

DESCRIPTION OF THE PRIOR ART

In the prior art, individual circuits have been constructed by draftsman for the particular circuit configuration under consideration. The resulting art work was photographed and used to produce a negative which was exposed on a sensitized copper clad board. Subsequent chemical treatment of the board left the copper clad areas corresponding to circuit connections exposed and available for mounting components. The components were then mounted on this board and the board was then used in the desired circuit.

To test such a board, separate connections were made to the individual board and its performance noted. If the performance of the circuit under test did not meet design specifications, components on the board were altered to improve the circuit performance. Of course, in many instances, this required additional art work in the redesign of the circuit board. Quite obviously, such techniques were costly, time-consuming and generally unsatisfactory where rapid design and prototype testing is required.

In another prior art method, experimental circuits were constructed on commercially available universal patterns. These circuit boards have a plurality of linear conductors and holes spaced to receive standard components. Component placement on such boards depended upon the component being used having physical dimensions corresponding to the predrilled hole configuration of the panel board.

Circuits made with this method have a breadboard appearance and require separate out-of-circuit testing as in the previously discussed method.

Both of these prior art method require testing be done by injecting signals directly onto the circuit board while it is in circuit configuration with other circuit boards, or the board must be removed from the circuit for testing. Such testing techniques have proven less than satisfactory because of the interaction with other circuit boards. In order to rapidly test such circuit designs, special test circuits are required. That is, a special test fixture must be constructed having a socket to accept the board under test. In most cases, a separate fixture is required for each type of board undergoing test. Such a system results in a plurality of test fixtures which have little application during ordinary usage and which are inconvenient to store. Because of the infrequent usage and likelihood of damage occurring during storage, the test fixtures must frequently be tested prior to circuit testing. Quite understandably, the aforedescribed prior art arrangements have limited applications in the modern electronic arts where frequently a circuit must be designed, tested, changed frequently, and used in prototype assemblies in a short span of time.

SUMMARY OF THE INVENTION

The invention employs a standard circuit board having a conductive layer on one side. The conductive layer is subdivided into a plurality of independent conductive areas. The areas are dimensioned as to accept any standard sized electronic component which may be fitted to the nonconductive side of the board. An electrical socket having a plurality of rows of connectors cooperates with the circuit board. One set of connectors is wired for the prototype circuit and the other is wired in a testing configuration. The particular row of conductors which contact the circuit board is determined by the facing direction of the circuit board when it is placed in the socket.

STATEMENT OF THE OBJECTS OF THE INVENTION

It is accordingly an object of this invention to provide an improved means and method for designing electronic circuits.

A further object of this invention is to provide an improved electronic circuit construction method and apparatus.

A further object of this invention is to provide an improved electronic circuit board design and socket arrangement for receiving the circuit board.

Another object of the present invention is to provide for a method of construction of experimental and prototype electronic circuits.

Another object of this invention is the provision of a method and means to accommodate developmental electronic circuits into a prototype circuit and test environment.

Another object of the present invention is the provision of an electronic circuit arrangement and method of operation thereof which facilitates testing individual circuits thereof when in operational circumstances an electrical malfunction occurs.

These and other objects of the invention will become more readily apparent from the ensuing specification when taken with the drawings.

BRIEF DESCRIPTION OF THE DRAWINGS

FIG. 3 is a sectional view taken along lines 3—3 of FIG. 2 and shows the constructional details of the socket according to the invention;

FIG. 4 is a perspective view of a circuit board according to the invention shown in exploded view relationship to a receptacle used in the practice of the invention;

FIG. 5 is a schematic representation of a circuit which may be used with the system of the invention; and FIG. 6 shows the mounting arrangement of the circuit according to FIG. 5 on the circuit board according to the invention.

DESCRIPTION OF THE PREFERRED EMBODIMENT

Figure 1:
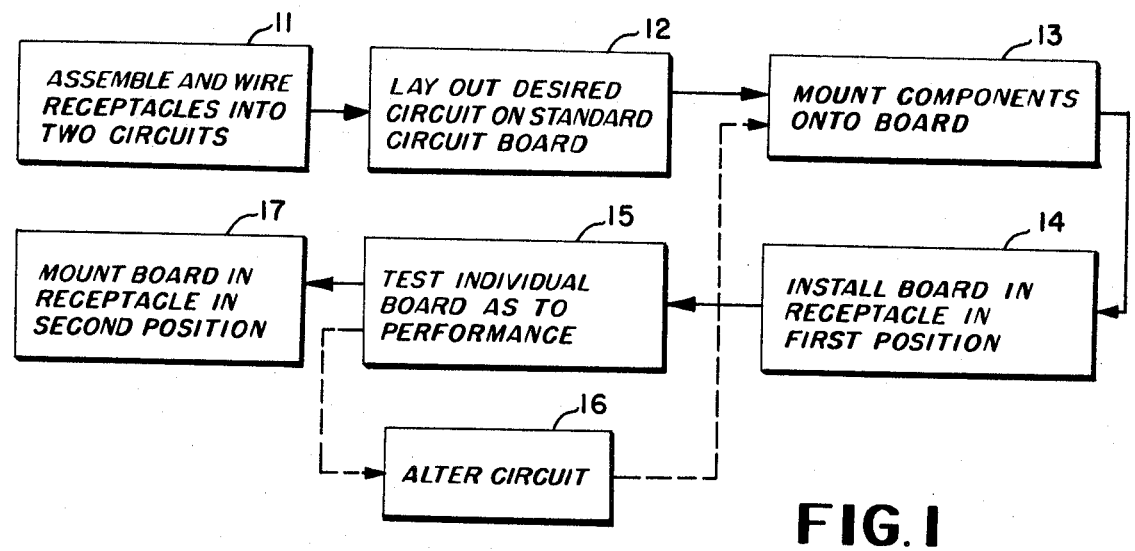
FIG. 1 is a flow diagram showing the relationship between the steps of the method of the invention.

Referring to FIG. 1, a flow diagram of the steps used in the practice of the method of the invention are illustrated as blocks, designated 11 through 17, arranged in the sequence in which the invention is practiced in the manufacture of a single circuit. Of course, the steps illustrated in FIG. 1 may be employed to produce a plurality of circuit boards and circuit configurations in accordance with the teachings described herein. In such instances, appropriate ones of the designated steps are repeated until the necessary number of components are produced. Likewise, it should be obvious to those versed in the electronic engineering arts that the steps illustrated in FIG. 1 may be performed with varying separations in time as well as spacial location. In other words, subassemblies may be produced according to some steps of the invention and stored or transported to other locations for completion of the remaining steps. Since such practices are commonplace in the electronic art, no further mention or description thereof will be given in the description of the individual steps of the invention. Likewise, the testing feature may be incorporated into production models to provide for field testing of individual circuits as a trouble shooting procedure.

Figure 2:
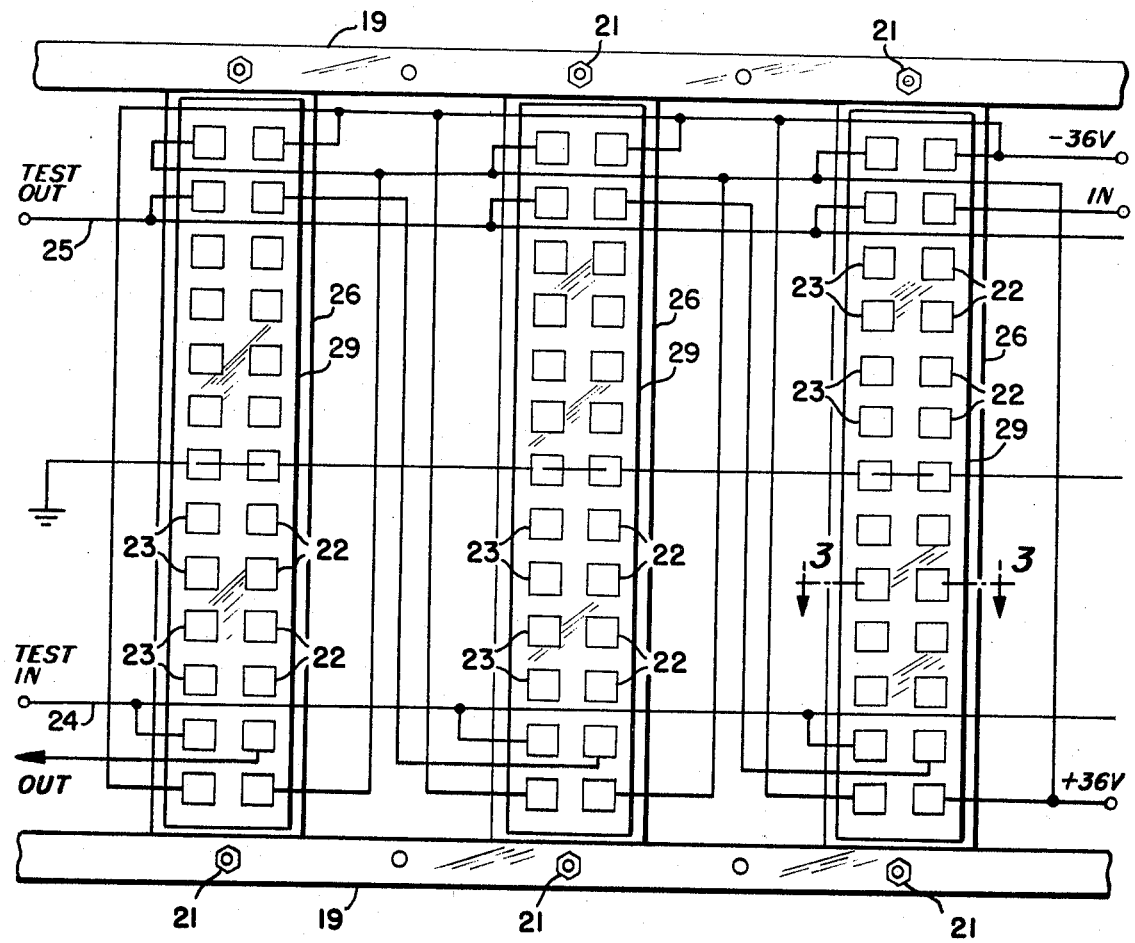
FIG. 2 is a bottom view of a plurality of the receptacles used in the invention including a diagramatic showing of the wiring.

With reference to FIG. 1, it will be noted that the first step in the practice of the invention is to assemble and wire electrical connectors into two circuits. The assembly portion of this step is conventional and carried forth in a well known fashion and may be better understood with reference to FIG. 2, which shows a plurality of suitable receptacles 18 mounted to extend between suitable side rails 19. Receptacles 18 and side rails 19 are conventional items of electronic hardware. However, for purposes of completeness, it should be noted that the receptacles 18 are of the type commonly used with dual sided circuit cards. That is, the receptacles used in the practice of the invention have been designed to operate with planiform circuit cards having conducting foil for contacts located on both sides of the card. The fashion in which this type socket cooperates with the printed circuit according to the invention, which has conducting foil on only one side, will be described in greater detail herein.

Likewise, receptacles 18 are to be considered as exemplary of the general class of such receptacles and the precise physical configuration of the receptacle and the number of terminals thereon is not essential to the understanding or practice of the invention and similar connectors or receptacles differing in these particulars may be used in place of or in conjunction with receptacle 18. Similarly, it will be noted with reference to FIG. 2 that receptacles 18 are mounted in every other placement position along rails 19 thereby leaving space between each receptacle. Quite naturally, this spacing is optional in the practice of the invention and was chosen for reasons of simplicity and illustration clearity.

Each receptacle 18 has two rows of terminals indicated at 22 and 23. In the wiring portion of the step represented by block 11 in FIG. 1, a circuit connection is made between individual ones of connectors from row 22 in each of sockets 18 so as to afford desired circuit connections between the individual circuit held therein and the succeeding or preceding circuit held in its appropriate receptacle 18. As will be observed, certain terminal placements are used for the supply of electrical power, others for the signal input connections, and others for the signal output connections. As will be noted, the power connections between connector rows 22 are also joined to a diagonally opposite connector in row 23 thereby affording a power supply to corresponding terminals of rows 22 and 23.

It will be observed, however, that the terminals of row 22 have the signal input terminals thereof connected to a common bus 24 labeled "test in". Similarly, the output terminals of row 23 are connected to a common bus 25 labeled "test out." It is this standarization of input and output connections and the symmetry of wiring each test receptacle 18 which permits the unique test feature of the instant invention.

Referring to FIg. 3, the details of this socket connection may be more clearly understood. As shown, receptacle 18 has a base member 26 having upright standards 27 on either end thereof. A groove 28 extends lengthwise along standards 27 to terminate in an internal cavity in an insulating clock 29. Insulating block 29 is held in base 26 by means of a flange 31. In the illustrated embodiment flange 31 and insulating block 29 are shown as being made of plastic material. However, if desired, the base 26 and upright standards 27 may be made of metal. Any suitable high strength plastic having the desired insulating qualities may be employed for the fabrication of block 29 as well as base 26. However, for purposes of completeness, it should be noted that polycarbonate, glass-filled plastic, has proven satisfactory and in the desired configuration provides 25,000 megom resistance between contacts.

As shown, terminals 22 extend through block 29 to terminate in a contact tip 32. Similarly, contact tip 33 is integrally formed with terminal 23 and provides contacting surface therefore. As will be well understood by those versed in the electronic arts, terminals 22 and 23 may have indentations or other irregularities, not shown, in order to facilitate their retention in block 29. Of course, conductors 34 and 35 are attached by soldering, for example, to the protruding ends of terminals 22 and 23.

Contact tips 32 and 33 are resiliently biased inwardly to provide a gripping action for circuit board assemblies inserted into receptacle 18. The insertion is accomplished by sliding the board downwardly in groove 28 of standards 27. The natural resiliency of the metalic material from which spring contacts tips 32 and 33 are formed provide a gripping action on the circuit board so as to retain circuit board in the receptacle 18. For normal applications, it has been found that a gripping force of the range of two ounces to one pound has been sufficient. However, for applications in which the mounted circuit card may be subjected to high accelerative forces or vibrational forces additional spring pressure may be desirable or, alternatively, other mounting means may be employed to prevent movement of circuit card within slot 28 and thereby prevent interruption of the circuit connection.

Referring again to FIG. 1, the flow diagram of the method of steps employed in the practice of the invention, it will be observed that the next step represented by block 12, is to lay out on the standard circuit board the desired circuit configuration. The standard circuit board used in the practice of the invention differs in some respects from circuit board arrangements of the prior art. The circuit board arrangement preferred in the practice may be best understood with reference to FIG. 4. As shown, an insulating sheet of plastic material has a plurality of conductive areas on one side. A central conducting area 37 extends from one edge of sheet 36 to the opposite edge. Thus, conducting area 37 divides sheet 36 into two equal areas. Each of these areas is, in turn, divided into a plurality of conductive patterns. At the remote edge from central conducting area 37, a generally L-shaped conductive area 38 extends across the sheet parallel to conductive area 37 and then along the opposite edge so as to provide an L-shaped conductive pattern. Similarly, the next conductive area 39 is congruent to the first 38. It will be noted, that in order to preserve the contact spacing the edges of the various conductive areas are offset toward the center of insulating sheet 36.

Spaced inwardly from conductive area 39, a conducting area 41 extends adjacent to conducting area 39 across panel 36 and parallel to the opposite edge to terminate just short of central conducting area 37. Conducting area 39 is terminated in a rectangular area 42 which extends along side central conducting area 37 toward the central area of panel 36. Conducting area 42 is shaped so as to provide a close spacing in the central area of panel 36 for multiple terminal devices to be mounted in the center of panel 36. As will be recognized by those versed in the electronic arts, such components may include sockets for multiple lead integrated circuits, vacuum tubes, or switching devices as well as the multilead device itself.

Similarly, successive conducting areas 43, 45, 47, and 49 continue the generally L-shaped pattern to substantially fill one half of the area of sheet 36. Each of these areas have rectangularly spaced conductive areas 44, 46, 48, and 51 in the general area of the center of panel 36. These rectangular areas provide opportunities to position the contacts of various electronic devices which might not conform in size to the spacing of the elongated portions of the conductive areas. These areas are desirable in the innermost area of the board to provide flexibility of mounting.

It will be observed that the other side of panel 36 is similarly filled with complimentary shaped conducting areas. It will be apparent to those versed in the electronic arts that the board of the instant invention is nearly all conducting area on one side. In fact, the conductive portion of Applicant's standard board is over 90 percent of the available surface area. This is of considerable advantage in layout design as well as conserving etchent solution where such solutions are used in the manufacture of these boards.

Furthermore, the conductive area of Applicant's board, being a simple geometric configuration, may be easily duplicated without expensive and time consuming art layouts. For example, it has proven satisfactory in practice to lay out a plurality of design patterns on a single sheet of paper using a ball point pen and duplicating these patterns on a photocopy machine to produce a plurality of paper negatives of the desired board conducting configuration. Each of these negatives are then used to produce a plurality of conducting boards which are cut apart after the printing and etching operation. Since these operations are well understood and in common usage in the circuit board design arts, no further description of these routine steps is included.

FIG. 4 also shows a perspective view of receptacle 18 showing the placement of vertical standards 27.

To further understand the layout of the circuit reference will be made to FIGS. 5 and 6 which illustrate how one such circuit may be accommodated on the board of the invention. FIG. 5 shows an integrated circuit element 52, of a conventional type, connected as an operational amplifier. It will be recognized that such circuits are common in the electronics art and although no particular significance is given to the illustrated configuration it will serve to illustrate the use of the method and apparatus of the invention. As shown, an eight conductor integrated circuit 52 is connected in circuit with resistors 53 through 59 and capacitors 61, 62, and 63 and diodes 64 and 65. Referring to FIg. 6, it will be observed that integrated circuit 52 is placed in the central region of circuit board 36 and the eight conductors connected to the conductive areas in the center region of the board. It will be observed that each of the connective junctions comprising circuit of FIG. 5 is brought out on a contact on the arrangement shown in FIG. 6.

The advantages of such an arrangement will be apparent to those versed in the circuit design arts. That is, each of the junctions of the various component elements is brought out to a contact on the edge of insulating sheet 36 and, hence, to a terminal on receptacle 18. For example, by installing appropriate measuring instruments to terminals on receptacle 18 the electrical potential at the junction of resistors 55 and 56 may be observed as well as the potential at the junction of resistor 57 and capacitor 63. This is of particular advantage when the circuit is in the testing mode as will be described presently.

Referring again to FIG. 1 it will be seen that the next step in the practice of the method of the invention is to install the components on the board determined in the layout of step 12. The mounting techniques employed in the practice of the present invention are conventional in the electronic arts with the exception that the holes for the individual components are drilled as needed rather than use predrilled holes as in the prior art circuit boards. Because of the shape and arrangement of the conducting areas, this is an easily performed operation and permits the components to be spaced for visual inspection, cooling, and other circuit considerations.

As shown by block 14, the next step in the practice of the invention is to install the circuit board within receptacle 18 such that the contacts along one edge of the board are placed in circuit connection with the row of terminals 23 so as to provide an operational test of the device. In this position, a test signal may be connected to the test input bus 24 by means of a suitable external terminal, not shown. Similarly, the output of the circuit undergoing test may be fed to a suitable measuring instrument via output bus 25 and suitable terminals, not shown, to a desired measuring instrument such as, for example, an oscilloscope. The test input signal and the output signal derived from the circuit constitute a test of the assembled circuit components as shown by block 15 of the flow diagram of FIG. 1. As previously noted, other circuit parameters may also be tested by connection of test instrumentation to the appropriate ones of terminals 23.

Frequently during the design stages of circuit engineering, component values must be adjusted from their calculated values to obtain the desired circuit operational parameters. To perform this adjustment, circuit board 36 is removed from receptacle 18 and the value of the circuit components are altered. This step, indicated by block 16, is a conventional laboratory technique in circuit design operations.

In many instances, the alteration of the values of component parts requires removing components from the board and installing others in their place. Again, this substitution of components is done by means of conventional mounting techniques and does not require further illustration or explanation to those who are conversant in the electronic design arts. When this removal and installation is complete, the process is repeated as indicated by the broken flow line extending from block 16 back to block 13. In some instances, the circuit components themselves may be adjustable. For example, in place of fixed resistors or capacitors variable units may be used. Obviously, in such instances removal and reinstallation of components on panel 36 would not be required. In such instances, the flow diagram would be modified to show the broken arrow extending from block 16 as connecting back into the flow sequence at block 14.

When the circuit undergoing test is performing satisfactorily, circuit board 36 is removed from receptacle 18 and is rotated 180° and reinserted in receptacle 18 such that the various contacts now cooperate with terminals 22. This step is represented by block 17. As previously explained, terminals 22 of each receptacle 18 are connected to the next receptacle in the desired circuit arrangement. The design process is now repeated for the next individual circuit in the modular arrangement of the particular circuit configuration being designed.

MODE OF THE PREFERRED OPERATION

Although the foregoing description is sufficient to enable persons versed in the electronic circuit design arts to make the device of the invention, the mode of operation thereof will be better understood by referring to the following description of the method of operation.

As may be best visualized with reference to FIG. 1, a plurality of circuit card receptacles are assembled into a unitary configuration. The number of receptacles used is equivalent to the number of individual stages that the complete circuit will have. The receptacles used have two rows of contacts each designed to cooperate with one side of the card. One set of contacts 22 are then wired to conform to the multiple stage circuit being designed. The second row of terminals 23 are wired into a test configuration pattern such that all power supply voltages are present on the correct pins but the input and output connections are connected to common test bus arrangements. If desired, other ones of terminals 23 may be suitably wired to test output terminals such that the voltages at any desired point on the circuit configuration may be read. Next a pre-etched circuit card having a plurality of similarly shaped rectolinear contact areas is drilled to accept the electrical components comprising the desired circuit, as indicated by block 13.

Next, as indicated by block 14, the circuit board 36 is inserted into the receptacle 18 corresponding to its position in the completed complex circuit but in such a facing direction that the contacts thereon cooperate with terminals 23 to place the circuit in a test configuration.

As indicated by block 15, performance tests are then performed on the circuit by placing the desired input signals for that type circuit on the "test in" bus 24 and observing the output signal taken from "test out" bus 25.

If the circuit does not perform satisfactorily, circuit board 36 is removed from receptacle 18 and suitable alterations are made thereto as indicated by block 16 and the steps of mounting the components having the altered values and the installation of the board in receptacle 18 as indicated by blocks 13 and 14 are repeated.

When the test results indicate that the circuit is performing satisfactorily, circuit board 36 is removed from receptacle 18 and is rotated 180° so as to face in the opposite direction and reinserted in receptacle 18. As indicated by block 17 in FIG. 1, this completes the circuit design in accordance with the invention.

It should be noted in the instant invention that the socket 18 cooperates directly with conducting areas on circuit board 36. Of course, if desired, separate contacts may be provided for engagement with mating contacts carried by receptacle 18. Likewise, circuit board 36 is illustrated as having 15 conductive elements to cooperate with an equal number of contacts on receptacle 18. Quite naturally, more or fewer such conducting areas may be employed, if desired.

The foregoing description taken together with the appended claims constitute a disclosure such as to enable a person versed in the electronics and circuit design arts and having the benefits of the teachings contained therein to make and use the invention. Further, the structure herein described meets the objects of invention, and generally constitutes a meritorious advance in the art unobvious to workers not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. The method of assembling and testing an electronic circuit comprising the steps of:
   assembling onto a support at least one circuit board receptacle having two sets of terminals each adapted to cooperate with one side of a circuit board;
   wiring one set of terminals on the receptacle into a desired first circuit configuration;
   electrically connecting the second set of terminals on each receptacle into a second circuit configuration connected to the first circuit for operational power but having independent input and output terminals for testing the individual circuit;
   laying out a desired circuit configuration on a standard circuit board having conducting surface on one side;

mounting component parts of the desired circuit onto the circuit board;

installing the completed circuit board in the receptacle in such a position that it is connected in circuit with the second set of terminals;

applying test signals to said circuit board through the previously connected test circuit so as to measure the electrical performance of the circuit board;

altering the electrical value of the components mounted on the circuit board to change the electrical performance thereof to obtain desired predetermined electrical characteristics; and removing said circuit board from the receptacle and reversing its direction and relacing it in the receptacle so as to place it in circuit relationship with said first set of terminals and the operational electrical circuit connected thereto.

2. The method of assembling and testing an electrical circuit according to claim 1 wherein the step of wiring one set of terminals includes the connection of the terminals into circuit relationship with similarly disposed terminals on other circuit board receptacles.

3. The method of assembling and testing electrical circuits according to claim 1 wherein the step of electrically connecting the second set of terminals includes the connection of the input terminal of the circuit to an external connector for insertion of an electrical test signal.

4. The method of assembling and testing electrical circuits according to claim 3 wherein the step of electrically connecting the second set of terminals includes the connection of the output terminal of the circuit to an external connector for connection of appropriate test instrumentation thereto.

5. The method of assembling and testing electrical circuits according to claim 1 wherein the step of altering the electrical value of components mounted on the board includes removal and replacement of the component by reperformance of the mounting step of the invention.

* * * * *